United States Patent Office 3,029,383
Patented Apr. 10, 1962

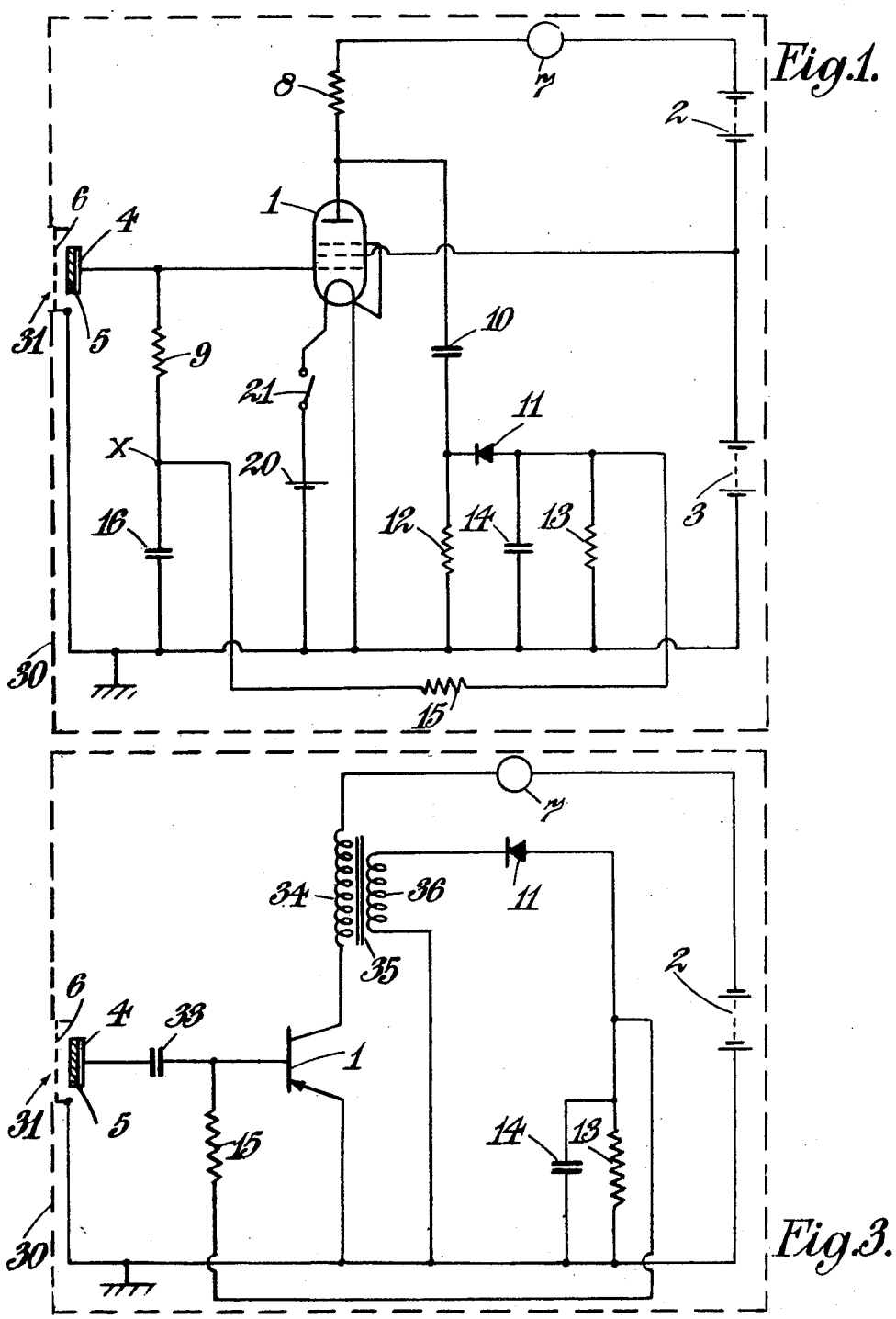

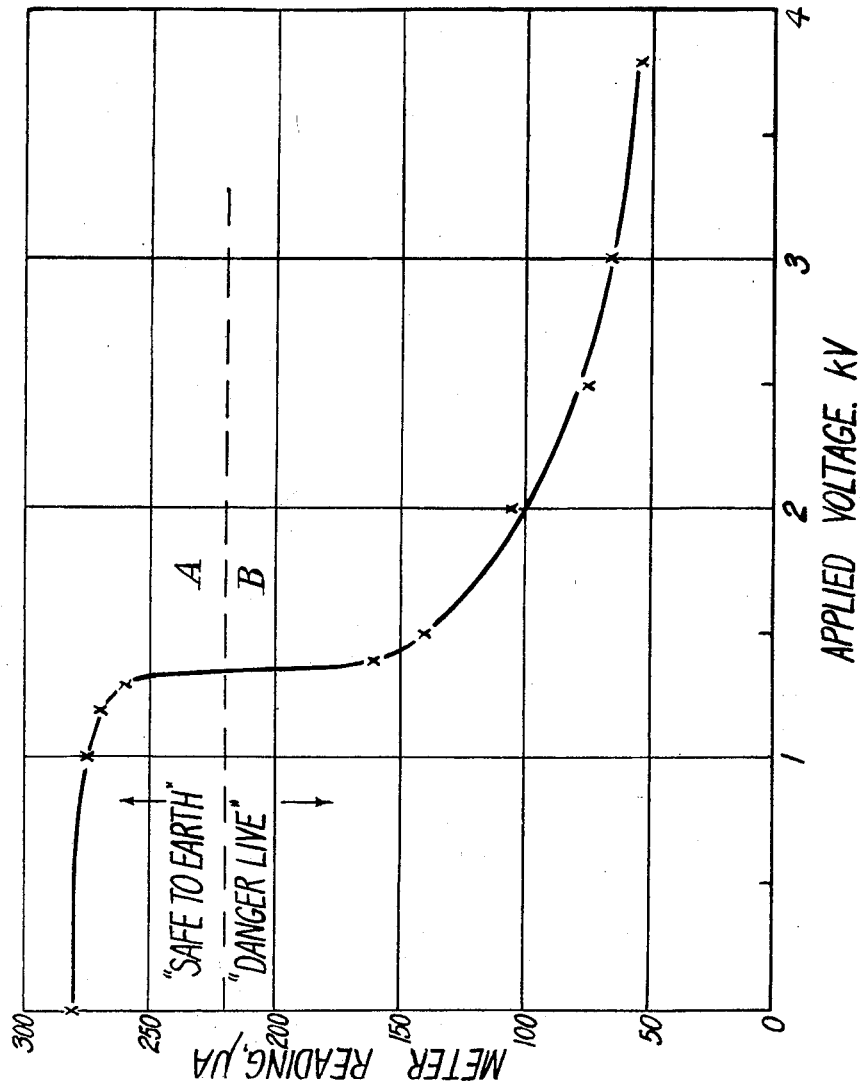

3,029,383
APPARATUS FOR TESTING THE ISOLATION OF AN ELECTRICAL CONDUCTOR FROM A SUPPLY SOURCE
John Lunn Douglas, Springwood Kennel Lane, Fetcham, near Leatherhead, England; Edmond Francis Hasler, 22 Albany Park Road, Leatherhead, England; and Peter Sidney Vick, 19 The Causeway, Downend, Fareham, England
Filed Sept. 14, 1959, Ser. No. 839,922
14 Claims. (Cl. 324—51)

This invention relates to apparatus for testing for the presence of an electrical conductor energised from an electrical supply source or the isolation of the conductor from the supply source.

In carrying out maintenance or test work on an electrical conductor forming part of or connected to alternating current supply systems, it is essential to ensure that the conductor has been isolated from all sources of supply prior to the application of an earth. Often in transmission and distribution networks the points of disconnection cannot readily be seen from the earthing position. It is an object of the present invention to provide an improved form indicator for determining whether an electrical conductor has been isolated from the supply.

In transmission and distribution networks, an isolated line will generally carry a direct potential due to the electrostatic charge determined by the instantaneous voltage of the line at the moment it was switched out, modified by subsequent leakage and further charge from friction, windage, etc. Superimposed upon this direct voltage may be an alternating voltage caused by capacitive or inductive pick-up from adjacent conductors or apparatus. Since the source impedance of such voltages is high, it is safe to earth such an isolated line, although it is not safe for human contact. It is essential therefore for any indicator to differentiate unambiguously between such induced voltages and the normal voltage when the conductor is conductively connected to the live system.

According to this invention, apparatus for testing for the presence of an electrical conductor energised from an alternating voltage supply source, comprises a capacitive probe electrode adapted to be positioned at a safe distance from the conductor, an amplifier coupled to the probe electrode for amplifying any voltage with respect to earth on the electrode, a rectifying and biasing circuit energised from the amplifier output and arranged, as the alternating voltage output of the amplifier rises above a predetermined value, to bias the amplifier so as to vary the mean output current flowing and means for indicating the mean amplifier output current. It will be understood that, particularly in very high tension systems, an operator must not approach too close to a live conductor and, by the expression "safe distance" it is to be understood that the apparatus would normally be employed at a distance from the conductor which is safe for the operator. For example, in the case of high tension overhead supply lines carried on towers, the apparatus might be used at the earthing point on the tower.

Preferably the rectifying and biasing circuit is arranged to bias the amplifier so as to reduce the mean output current flowing as the alternating voltage output rises and so to make the amplifier conductive for a smaller fraction of each cycle of the alternating voltage.

The amplifier is normally biased so as to be fully conductive with zero voltage applied to the probe electrode. Thus, if any signal voltage is applied to the capacitive electrode, the mean amplifier output current remains at a maximum until the alternating output voltage of the amplifier reaches a sufficient value for the rectifying and biasing circuit to bias the amplifier and so cause a reduction in the indicated output current. This reduction continues with increase in applied voltage until the amplifier is so biased that it only conducts at the peak of each cycle of the applied voltage, resulting in a very small output current indication. The circuit then becomes relatively insensitive to further increase in the applied voltage, since the amplifier must continue to conduct for a brief period during each cycle to maintain the necessary bias.

The response of the apparatus, therefore, is such that it will give a maximum reading on the indicating means until the input signal reaches a certain level. Further increase of the applied signal causes a rapid reduction of this indication to a minimum reading which changes little for any continued increase in the applied signal input. By suitable adjustment of the point at which the decrease in indicated output occurs, in relation to the normal operating voltage of the conductor to be tested (which is capacitively coupled with suitable spacing to said electrode) this apparatus can be used to determine whether the conductor is still connected to a supply source or whether it is isolated therefrom and may be safely earthed. Any failure in the apparatus such as, for example, a failure in its power supply or a failure in the amplifier tending to reduce the amplifier output, results in the apparatus producing a smaller output indication and thus indicating danger conditions.

The operation of the apparatus may be readily checked by first screening the capacitive electrode and checking that the output current is at a maximum and by then moving the screen and checking that the output decreases when a suitable charged body is moved adjacent to the capacitive electrode.

The aforementioned rectifying and biasing circuit conveniently comprises a biased rectifier system arranged to produce an output only when the input voltage to the rectifier system exceeds said predetermined value. Conveniently, the rectifier comprises one or more metal rectifier elements, the number being so chosen that the rectifier system as a whole, due to the voltage-current characteristics of the rectifier, gives no output until the input voltage applied to its exceeds said predetermined value. Alternatively, one or more rectifier elements may be biased by connecting the two sides of the rectifier to points of suitably different potential.

The output from the rectifier system may be applied to the amplifier through a smoothing circuit.

The aforementioned amplifier conveniently comprises a single stage electronic valve amplifier. In such a valve amplifier, the capacitive probe electrode may be connected to the control grid and the indicating means connected to measure the anode current of the valve. For example, the indicating means may comprise a direct current meter connected in series in the anode circuit of the valve.

For most purposes it is desirable that the apparatus should be portable and conveniently a battery operated apparatus is provided so that the whole instrument may be arranged as a single portable unit. In situations where such apparatus is likely to be used, high values of stray field may exist and, for this reason, the instrument is preferably completely screened apart from the probe electrode.

In order that the invention may readily be carried out, two embodiments will now be described in detail, by way of example, with reference to the accompanying drawings of which:

FIGURE 1 is a schematic circuit diagram of an apparatus for testing and indicating whether a conductor is live or isolated;

FIGURE 2 is a performance curve referred to in the description of operation; and FIGURE 3 is a schematic circuit diagram of a modified apparatus using a transistor amplifier.

The embodiment shown in FIGURE 1 employs a valve amplifier 1, the filament of which is supplied from a dry cell 20 by way of a switch 21. The apparatus is arranged as a portable instrument in which the anode supply batteries 2, 3 and the circuit components are enclosed in a metal case 30 having an aperture 31 of suitable size. Behind this aperture is a conductive plate 4, with an insulating covering 5, which functions as the probe electrode.

The insulating covering 5 may be arranged so as to ensure that the conductive plate 4 is readily positioned at the required distance from the conductor to be tested. A movable screen 6, electrically connected to the case 30 of the apparatus, is provided to enable the probe electrode 4 to be screened for test purposes.

A direct current moving coil indicting meter 7 is mounted so as to be visible through a second aperture in the case. The probe electrode 4 is connected to the control grid of valve 1, which is a pentode amplifier valve type DL66. In this construction, the screen grid of valve 1 is connected to the positive terminal of 15 volt battery 3, the other terminal of which is connected to the casing of the apparatus. The anode of valve 1 is connected through a load resistance 8 of 47,000 ohms and the direct current meter 7 to the positive terminal of a 15 volt battery 2, the negative terminal of which is connected to the positive terminal of battery 3. The grid of valve 1 is connected through a grid leak resistor 9 of 150 megohms to a source of bias potential, to be described later, at the point X.

Alternating voltage signals developed at the anode of valve 1 are applied to a rectifier system 11 by means of a resistance capacity network. The network comprises a direct current blocking capacitor 10 of 0.1 microfarad capacity, connected between the anode and the input to the rectifier 11, and a resistor 12 of 100,000 ohms connected between the input of the rectifier 11 and the case of the apparatus.

The rectifier 11 comprises a number of selenium elements, the number being so chosen that the rectifier is inoperative until the input signal voltage to the rectifier 11 exceeds the predetermined amount associated with pick-up from an isolated but unearthed conductor under test at the appropriate test distance.

The output from the rectifier 11 is developed across an output load resistor 13 of 10 megohms shunted by a 0.02 microfarad reservoir condenser 14 and, after smoothing by the condenser 14, a series 22 megohm resistor 15 and a second 0.02 microfarad condenser 16, is applied at point X and through the grid leak resistor 9 to the grid of the valve 1, so as to act as a negative bias. This bias reduces the mean anode current flowing as the rectifier output increases.

Instead of using a resistance-capacitance coupling between the amplifier and the rectifier, a transformer coupling might be used. In a further alternative arrangement, instead of using the delay voltage associated with the metal rectifier elements 11, separate biasing of the rectifier may be used by returning the two sides of the rectifier to points of suitably different potential. Other rectifier arrangements may be employed, for example a voltage doubler system.

Dependent upon the size and design of the aperture and probe electrode assembly, the instrument described may be used, for example, to ascertain with certainty whether metal-clad switchgear spouts operating at 3.3 kv. and upwards are isolated and may safely be earthed. Transmission lines operating at 132 kv. and upwards can also be similarly tested. Variations in circuit details and probe electrode design can enable other voltage ranges to be covered.

In certain applications it may be desirable for a direct connection to be made to the probe electrode from the conductor under test. In such a case, a capacitance of suitable value and construction for the voltage range concerned may be inserted between the probe electrode 4 and the grid connection (including the grid leak) of the amplifying valve 1.

One important point, in view of the high values of resistance used in this example, is the reduction of the effects of humidity when used under inclement weather conditions. This may be effected by a "potting" process, or by coating all wiring and components with a moisture-repellent material such as silicone varnish.

The operating procedure is intended to provide a check that the instrument is working, by ensuring that, on switching on with the probe electrode 4 completely screened, the meter 7 gives a maximum deflection, corresponding to "Safe to Earth." This corresponds to the region "A" shown in FIGURE 2. Removal of the screen 6 allows the instrument to read. The valve 1 is normally biased so as to be fully conductive with zero voltage applied to the probe electrode 4, as is shown in FIGURE 2. With only a small signal voltage appearing on the probe electrode 4, the mean anode current of valve 1 remains substantially at the maximum value until the alternating output voltage of the amplifier reaches a critical value. This first part of the response curve is shown in the region "A" of FIGURE 2. When the amplifier output reaches a sufficiently high value for the rectifier and biasing circuit to modify the bias of valve 1, an abrupt fall in mean anode current results, so carrying the response curve into the region "B" of FIGURE 2. The reduction in anode current continues with increase in voltage appearing on the probe electrode 4 until the valve 1 is so biased that it conducts only at the peak of each cycle of the applied voltage. The anode current has by this time dropped to about a third of its maximum and beyond this point further reduction of anode current with increasing signal voltage is small.

The instrument may again be checked by rapidly moving an electrostatically charged body in front of the probe aperture, when the meter 7 will move towards "Danger Live," corresponding to the region "B" shown in FIGURE 2. This procedure may be reversed as a final check after the test reading has been made on the conductor concerned. Failure of the valve 1 will, of course, result in no meter deflection, and run-down batteries produce a similar effect, corresponding to "Danger, Live" on the meter scale. It will be seen that, with this instrument, checking may be made inherent in the operating procedure, and that any maloperation is either readily observable or results in an indication of danger.

The embodiment shown in FIGURE 3 also employs a battery operated amplifier but, in this case, the amplifier 1 is a transistor. The circuit components are similarly enclosed in a metal case 30 having an aperture 31 of suitable size behind which the capacitive probe electrode 4 is mounted. The probe electrode 4 is similarly provided with an insulating covering 5 which may be so dimensioned as to serve for the positioning of the probe electrode 4 at the correct distance from the conductor under test. A movable screen 6 can be moved into position over the aperture in the metal case to screen the probe electrode 4, in similar manner as for the embodiment of FIGURE 1. The direct current moving coil indicating meter 7 is similarly mounted in the case in a suitable position for viewing.

As shown in FIGURE 3, the probe electrode 4 is connected by way of a condenser 33 to the base electrode of the transistor 1. The emitter electrode is directly earthed to the case 30. The collector electrode of transistor 1 is connected by way of the primary winding 34 of a transformer 35 and the indicating meter 7 to the negative pole of a 6 volt battery 2. The positive pole of battery 2 is earthed to the case.

One end of the secondary winding 36 of transformer 35 is earthed directly to the case and the other end is connected to earth by way of the series combination of the rectifier system 11 and a load resistor 13 of 390 kilohms. A smoothing filter connected to the junction of the rectifier 11 and load resistor 13 comprises a smoothing condenser 14 of value 0.1 microfarad and a series resistor 15 of value 470 kilohms. The resistor 15 is connected to the base electrode of transistor 1.

The mode of operation of this embodiment corresponds exactly to that of the embodiment using a valve amplifier previously described. The alternating voltage appearing on the probe electrode 4 is effective in the base to emitter circuit of the transistor 1 and the amplified voltage in the collector to emitter circuit is transferred by way of transformer 35 to the rectifying and biasing circuit. When the voltage applied to this circuit reaches a critical value, which value is determined by the characteristics of the rectifier system 11, a bias is applied to the base electrode of the transistor 1, causing the current indicated by the meter 7 to fall abruptly for a very small increase in signal voltage. The reading of the meter 7 is thereby changed from the indication "Safe to Earth" to the indication "Danger Live."

Although the invention has been more particularly described and claimed as apparatus for testing for the presence of a conductor energised from an alternating current supply, it may also be used for detecting the presence of a direct potential by using for example an electrode system with an oscillatable screen as described in co-pending United States application Serial No. 839,923, filed September 14, 1959, of Peter S. Vick entitled "Electrodes for Apparatus for Testing the Isolation of a Conductor From a Source of an Electrical Supply."

We claim:

1. Apparatus for testing for the presence of an electrical conductor energised from an alternating current supply source comprising a capacitive probe electrode, an amplifier coupled to the probe electrode for amplifying any voltage with respect to earth on the electrode, a rectifying circuit energised from the amplifier output to produce a biasing signal dependent on the peak value of the amplified alternating signals, circuit means for applying said biasing signal to said amplifier so that, as the alternating voltage output of the amplifier rises above a predetermined value, the amplifier is biased so as to vary the mean value of the uni-directional current flowing through said amplifier and means for indicating the mean amplifier output current.

2. Apparatus for testing for the presence of a live electrical conductor comprising a capacitive probe electrode, an amplifier coupled to the probe electrode for amplifying any alternating voltage with respect to earth on the electrode, a rectifying and biasing circuit energized from the amplifier output and coupled to the amplifier input to bias the amplifier so as to reduce the mean uni-directional current flowing through said amplifier below the initial maximum conduction of the amplifier as the alternating voltage output rises from zero to a predetermined value and, on further rise of the alternating voltage output, to make the amplifier conductive for a smaller fraction of each cycle of the alternating voltage, and means for indicating this means uni-directional current.

3. Apparatus as claimed in claim 2 in which the rectifying and biasing circuit comprises a number of metal rectifier elements, the voltage-current characteristic of the rectifier elements then determining the input voltage above which the rectifier system provides an output.

4. Apparatus as claimed in claim 2, in which the rectifying and biasing circuit comprises at least one rectifier element biased by connection of the terminals thereof to points of different potential.

5. Apparatus as claimed in claim 1 in which the rectifying circuit includes a smoothing filter.

6. Apparatus for testing for the presence of a live electrical conductor comprising a capacitive probe electrode, an alternating current valve amplifier including a valve with a signal input grid, means connecting said probe electrode to said signal input grid to apply thereto a voltage dependent on any alternating voltage on said probe electrode, a rectifying circuit coupled to said amplifier to be energised by the output thereof to provide a bias voltage dependent on the peak output of the amplifier, circuit means applying said bias voltage to said amplifier to reduce the mean value of the uni-directional current through said amplifier below the initial maximum conduction of the amplifier as the peak alternating voltage output rises from zero to a predetermined value and, on further rise of the alternating voltage output, to make the amplifier conductive for a smaller fraction of each cycle of any alternating voltage applied to said amplifier from said probe electrode, and indicating means for indicating the magnitude of the uni-directional amplifier output current.

7. Apparatus as claimed in claim 6 wherein said valve has a plate with an output circuit connected thereto and wherein said indicating means comprises a current indicator in said output circuit.

8. Portable apparatus for testing for the presence of a live electrical conductor comprising a metal case forming a screened container and having an aperture, a capacitive probe electrode in said case adjacent said aperture, a battery operated alternating current valve amplifier in said case and including a valve with a signal input grid, a rectifying circuit coupled to said amplifier to be energised by the output thereof to provide a bias voltage dependent on the peak output of the amplifier, circuit means applying said bias voltage to said amplifier to reduce the mean value of the uni-directional current through said amplifier below the initial maximum conduction of the amplifier as the peak alternating voltage output rises from zero to a predetermined value and, on further rise of the alternating voltage output, to make the amplifier conductive for a smaller fraction of each cycle of any alternating voltage applied to said amplifier from said probe electrode, and indicating means for indicating the magnitude of the uni-directional amplifier output current.

9. Apparatus as claimed in claim 8 wherein a removable auxiliary screen is provided to cover the probe electrode aperture.

10. Apparatus for testing for the presence of a live electrical conductor comprising a capacitive probe electrode, an alternating current transistor amplifier including a transistor with a base, emitter and collector, means connecting said probe electrode to said base to apply thereto a signal dependent on any alternating signal on said probe electrode, a rectifying circuit coupled to said amplifier to be energised by the output thereof to provide a bias voltage dependent on the peak output of the amplifier, circuit means applying said bias voltage to said amplifier to reduce the mean value of the uni-directional current through said amplifier below the initial maximum conduction of the amplifier as the peak alternating output current rises from zero to a predetermined value and, on further rise of the alternating voltage output, to make the amplifier conductive for a smaller fraction of each cycle of any alternating signal applied to said amplifier from said probe electrode, and indicating means for indicating the magnitude of the uni-directional amplifier output current.

11. Apparatus as claimed in claim 10 wherein said indicating means are connected in the collector-emitter circuit of said transistor.

12. Portable apparatus for testing for the presence of a live electrical conductor comprising a metal case forming a screened container and having an aperture, a capacitive probe electrode in said case adjacent said aperture, a battery operated alternating current transistor amplifier in said case and a transistor with a base, emitter and collector, means connecting said probe electrode to said base to apply thereto a signal dependent on any alternating signal on said probe electrode, a rectifying circuit coupled to said amplifier to be energised by the output thereof to provide a bias voltage dependent on the peak output of the amplifier, circuit means applying said bias voltage to said amplifier to reduce the mean value of the uni-directional current through said amplifier below the initial maximum conduction of the amplifier as the peak alternating output current rises from zero to a predetermined value and, on further rise of the alternating voltage output, to make the amplifier conductive for a smaller fraction of each cycle of any alternating signal applied to said amplifier from said probe electrode, and indicating means for indicating the magnitude of the uni-directional amplifier output current.

13. Portable apparatus as claimed in claim 12 wherein a a removable auxiliary screen is provided to cover the probe electrode aperture.

14. Apparatus for testing for the presence of a live electrical conductor comprising a capacitive probe electrode, an insulated covering on said electrode, an amplifier coupled to the probe electrode for amplifying any alternating voltage with respect to earth on the electrode, a rectifying and biasing circuit energised from the amplifier output and arranged, as the peak alternating voltage output of the amplifier rises above a predetermined value, to bias the amplifier so as to reduce the mean value of the uni-directional current flowing below the initial maximum conduction of the amplifier, and means for indicating the mean uni-directional amplifier output current.

References Cited in the file of this patent

UNITED STATES PATENTS

| | | |
|---|---|---|
| 1,745,419 | Henneberger | Feb. 4, 1930 |
| 2,215,777 | Benz | Sept. 24, 1940 |
| 2,531,609 | Bulgin | Nov. 28, 1950 |